Oct. 20, 1936.  C. S. O'NEIL ET AL  2,058,098
COOLING AND DISPENSING SYSTEM
Filed April 23, 1934  5 Sheets-Sheet 1

Inventors:
Charles S. O'Neil
Elmer M. Wachtel
By A. Trevor Jones Atty.

Oct. 20, 1936.   C. S. O'NEIL ET AL   2,058,098
COOLING AND DISPENSING SYSTEM
Filed April 23, 1934   5 Sheets-Sheet 2

Inventor
Charles S. O'Neil
Elmer M. Wachtel
By A. Trevor Jones
Atty.

Fig. 2

Oct. 20, 1936.  C. S. O'NEIL ET AL  2,058,098
COOLING AND DISPENSING SYSTEM
Filed April 23, 1934   5 Sheets-Sheet 4

Inventors:
Charles S. O'Neil
Elmer M. Wachtel
By: A. Trevor Jones Atty.

Patented Oct. 20, 1936

2,058,098

UNITED STATES PATENT OFFICE 2,058,098

COOLING AND DISPENSING SYSTEM

Charles S. O'Neil and Elmer M. Wachtel, Two Rivers, Wis., assignors to Hamilton Manufacturing Company, Two Rivers, Wis., a corporation of Wisconsin Application April 23, 1934, Serial No. 721,849

14 Claims. (Cl. 62—141)

This invention relates to cooling and dispensing systems.

The invention is of particular utility in connection with the cooling and dispensing of liquids and more especially of carbonated beverages such as beer or the like, and among other objects aims to provide simple and compact dispensing means, together with means for efficient and rapid cooling of the beer, which permits intermittent drawing of the beer in a satisfactory condition of temperature, gas content, and proportion of foam.

In one aspect, the invention contemplates a source of intense cold or low temperature area, to provide for which we desirably use solidified carbon dioxide commercially known as "dry ice", and the circulating of a fluid carrier of heat such as alcohol into proximity first with the "dry ice" and then with a higher temperature heat-exchange area in proximity with which the beer is also caused to circulate, the flow of the alcohol or other carrier between the first area and the second area being automatically controlled proportionally to the temperature differential between the beer and the alcohol, this control being in turn responsive to the flow of the beer under the more or less intermittent demands for draught purposes. Thus, the latent heat of sublimation of the "dry ice" is taken largely from the alcohol and the heat of the alcohol is taken largely from the beer to be cooled, the alcohol desirably remaining liquid at all times.

The invention desirably includes a combined settling and storage container which is in the cooling and dispensing circuit and which serves to maintain a reserve supply of beverage both previously cooled and maintained cooled, while at the same time this reservoir functions as a settling or tempering means for such carbonated beverages, for example as beer, and ensures that the beer has the proper body, gas content, etc., all to provide a beverage attractive in appearance and palatable to the taste.

The invention further desirably makes use of the gas of sublimation of the "dry ice" to provide a usable pressure which in this instance is advantageously employed to cause the beer to circulate through the system, thus making use not only of the heat-exchange function of the "dry ice," but also employing the gas therefrom, which would otherwise go to waste, to deliver usable mechanical energy.

Other objects and advantages will be apparent from the following description of an illustrative system constructed in accordance with the invention and shown in the drawings, in which—

Figure 1a is a general view somewhat schematic showing the illustrative system;

Figure 6 is a plan view, partly broken away for clearness of description, of the heat transfer plate, also shown in Figure 1a;

Figure 7 is an enlarged section taken on the line 7—7 of Figure 6; and

Referring in detail to the figures of the drawings, the cabinet 10 is shown divided into two parts, the lower part 11 which provides a compartment for the supply of "dry ice," or other source of cold and the upper part 12 which provides housing means for the storage and settling container and its associated mechanism, thus enclosing substantially the entire system compactly and presentably, so that the cabinet may be installed in the usual public tavern or other shop and present somewhat the appearance of an article of furniture. The cabinet may be constructed of wood, metal or other suitable material, ornamented as desired. The lower portion 11 of the cabinet is of course lined with ample heat-insulation material 13, such as cork or the like, providing the insulated space 14 in the interior of the "dry ice" compartment. A section of the compartment is movable to provide the usual door closure 15, having fastening means 15a of any suitable conventional construction, and through which the "dry ice" or other cold element may be inserted, in this instance in the form of a cake 16. In the present embodiment the maximum capacity of the compartment 14 is about 75 lbs. Standard-size cakes are readily obtainable on the market, of 50 lbs. weight, having dimensions of say 10" x 10" x 10" or of 25 lbs. weight, having dimensions of say 10" x 10" x 5". It has been found that the system will operate with a cake as small as 20 lbs. The construction illustrated is such that the losses by radiation into the compartment 14 in twentyfour hours account for about eleven to twelve pounds of the "dry ice," which, since the "dry ice" is now obtainable at relatively low prices, is not prohibitive. Of course even these losses could be readily reduced by increasing the insulation for the compartment 14.

The relatively high temperature heat exchange area, the heat from which is to be transmitted to the "dry ice," is represented in general by a combined storage and settling container indicated as a whole by the numeral 17. This container as here shown comprises an inner metallic shell 18 and an outer shell 19 both of which are cylindrical, and are maintained in telescoping spaced-apart relationship by being suitably secured to an annular rim casting 20. Thus arranged, an annular space 21 is left between the vertical walls of the shells 18, 19 which is closed by the rim casting 20 and also a space 22 at the bottom of the container between the horizontal bottoms of the shells, these spaces communicating and also communicating with the passage 23 in the rim casting 20. The interior 24 of the container within the inner shell 18 affords a reservoir which is hermetically sealed by a cover plate 25 which has an annular groove 26 on its margin and in which is received an annular bead 27 on the rim casting 20, an annular gasket 28 being interposed between the parts. To effect a pressure-tight seal between the cover plate and the reservoir we have shown clamping means represented by diametrically disposed overhanging lugs 29 formed integrally with the rim casting, and a bar 30 which may be engaged by the lugs 29. A hand screw 31 passing through the bar 30 may be turned into tight engagement with the cover 25.

Figure 1:
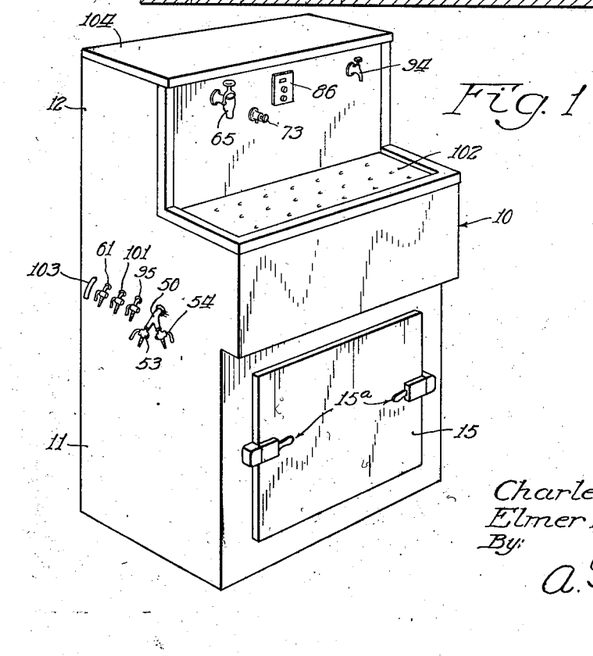
Figure 1 is a perspective view of a cabinet adapted to house our improved device.
Figures 1A, 6, 7:
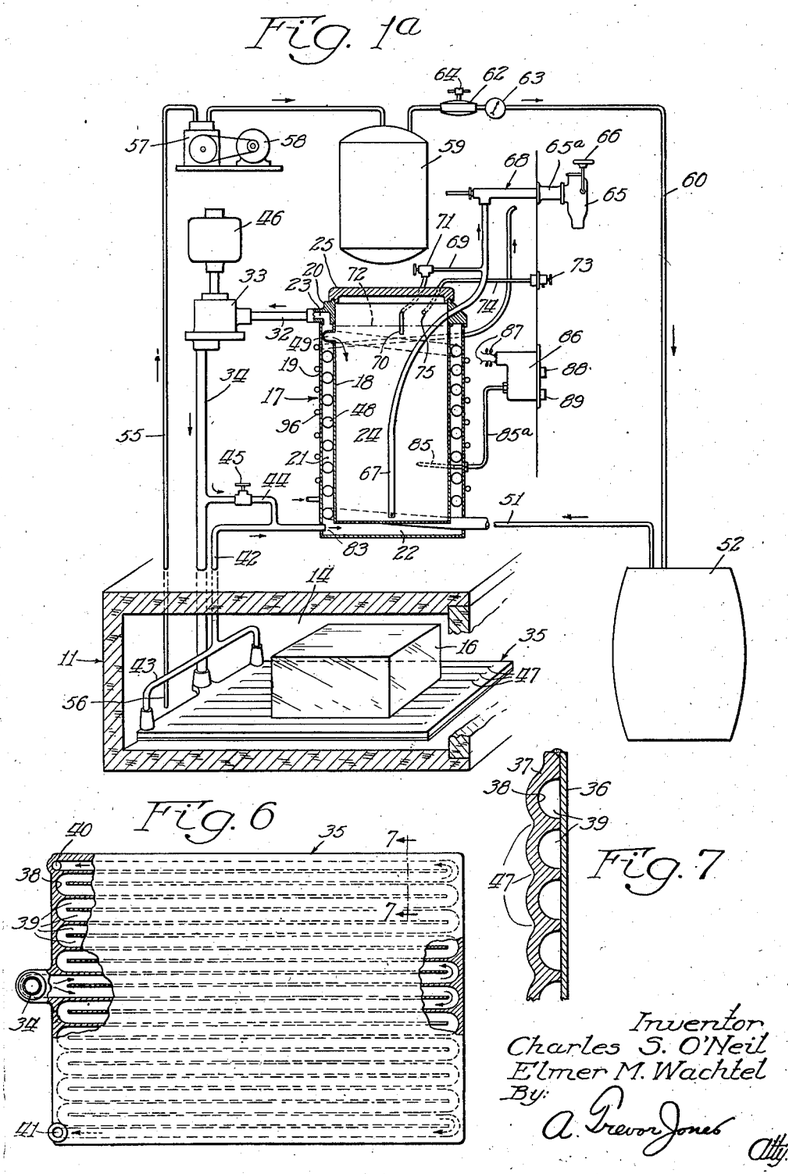
Figure 2:
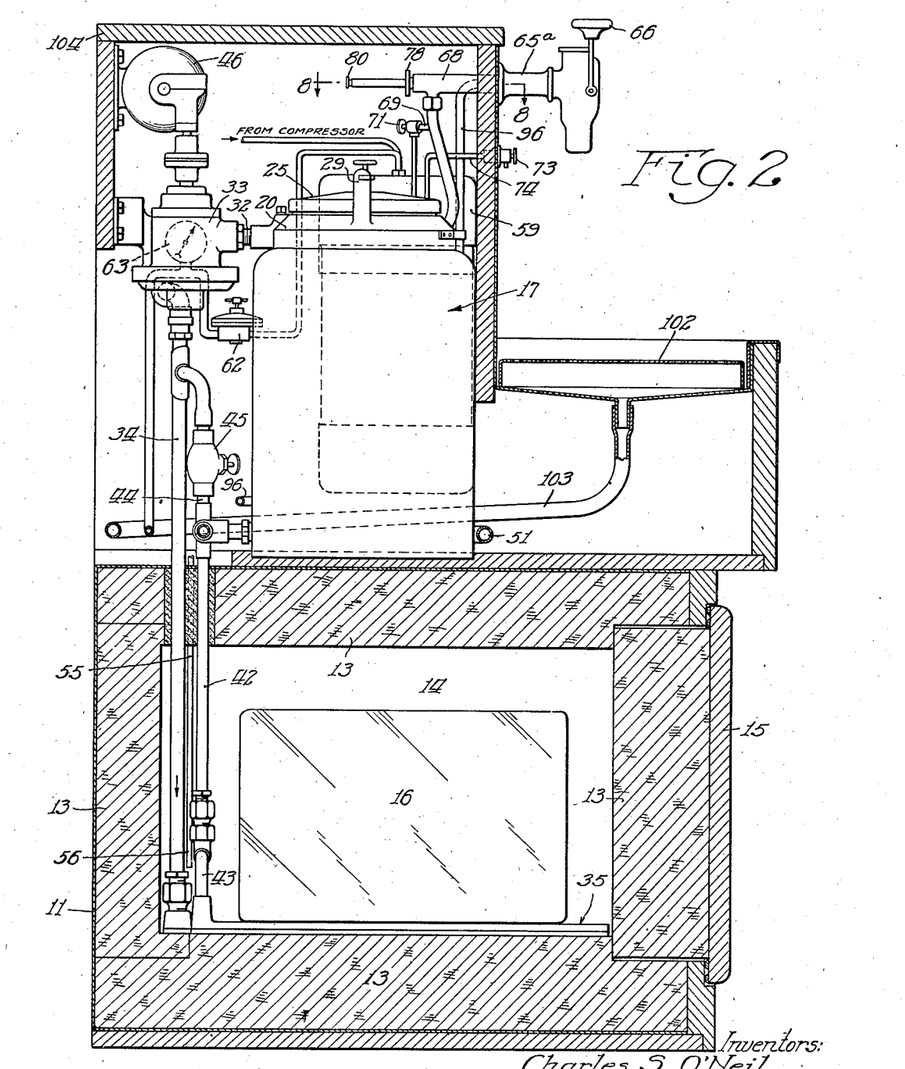
Figure 2 is a vertical transverse sectional view of the cabinet shown in Figure 1 on a somewhat larger scale.
Figure 3:
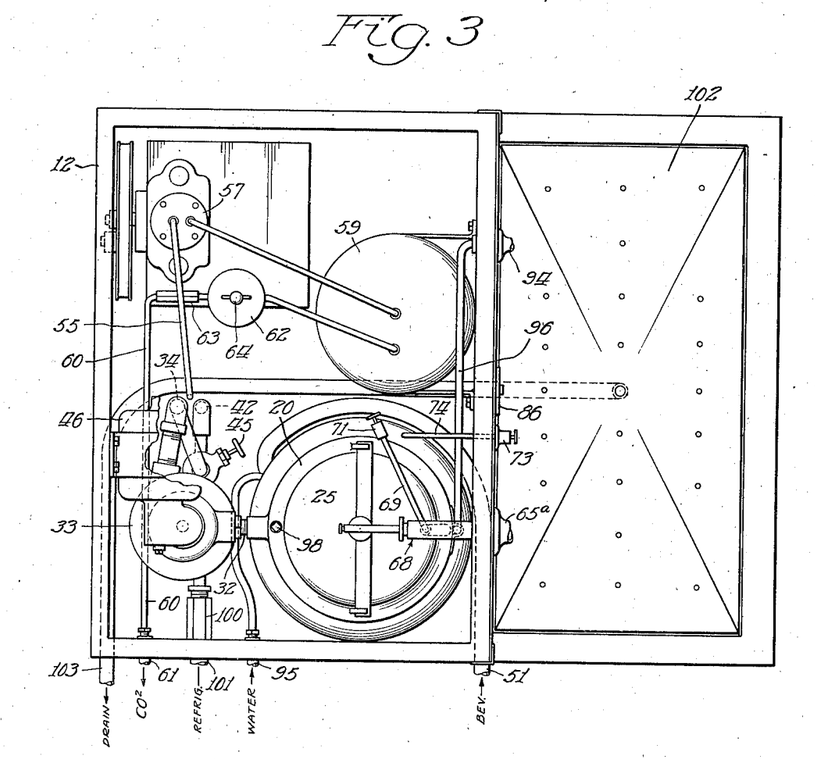
Figure 3 is a top view of the cabinet showing the cover removed and the mechanism in plan.

The passage 23 in the rim casting 20, which communicates with the space between the inner and outer walls of the container 17 has suitably connected thereinto a pipe 32 leading to a pump 33 of any suitable commercial design from which a pipe 34 is led through the insulated walls of the "dry ice" compartment 14 and terminates in a heat-exchange element such as the metallic heat transfer plate 35, within the compartment 14. This heat transfer plate 35 is desirably formed with a flat base 36 and a grooved top 37 welded or otherwise secured to the base so that the grooves 38 in the part 37 are wholly closed by the base 36 and thereby form ducts 39 in the interior of the heat-transfer plate. As best shown in Figure 6, the ducts 39 extend throughout the plate, one communicating with the other. The pipe 34 communicates with both of the two ducts in the center of the plate, and the ducts to each side of the center communicate each with the one next to it at alternate ends of the plate, thus providing two separate devious paths through the plate 35, each path communicating with the pipe 34 and terminating in an outlet 40 and 41 respectively at each side of the plate. A pipe 42 having a bifurcated foot 43 communicates with both of the outlets 40 and 41. At its other end, the pipe 42 leads into the space 22 between the inner and outer shells 18, 19 of the container 17. A by-pass pipe 44 connects directly the pipes 34 and 42 and is controlled by a hand-regulated valve 45. Thus the pipes 34 and 42 are in communication both through the heat-transfer plate 35 and through the by-pass pipe 44. The pipe 34 (through pump 33 and pipe 32) and the pipe 42 are in communication at the top and bottom respectively with the spaces 21 and 22 between the shells 18, 19 of the container 17.

Through this portion of the system just described, by means of the pump 33 driven by a motor 46, we circulate our fluid carrier of heat, which in this instance is alcohol. For our purpose, we have found that a suitable alcohol is normal butyl alcohol, commercially known as "Butanol," which has a freezing point of $-130°$ F., well below the temperature of the "dry ice," which is about $-109°$ F. It also has a boiling point well above any temperature which will be encountered in the normal use of our system, thus remaining desirably liquid at all times.

The cake of "dry ice" 16 is shown supported by the heat-transfer plate 35, lying directly on the upper portion 37 of the plate which has its upper surface advantageously corrugated as at 47 to provide an increased radiation surface through which the sensible heat of the circulating alcohol is rapidly transmitted and given up to the "dry ice," due to the large temperature differential between the alcohol and "dry ice." As presently more particularly explained, all of the alcohol need not pass through the heat transfer plate 35 and a portion may be by-passed through the by-pass pipe 44.

In accordance with our invention, the beer or other beverage is circulated first through a pipe 48 coiled spirally within the space between the inner and outer shells 18, 19 of the container 17, the coiled pipe 48 terminating near the top of the container in a port 49 which communicates with the interior of the inner shell 18, that is the main interior or reservoir 24 of the container. At the bottom of the tank the coiled pipe 48 desirably has at least one turn somewhat reduced in diameter and disposed in the space 22 and from there continuing outside of the container to terminate in any suitable inlet fitting such as the valve-fitting 50 (Figure 1), to which may be connected the pipe 51 (Figure 1a) leading from a source of beverage supply such as the beer keg 52, which may be located in any convenient place, for example in the basement. The fitting 50 may be bifurcated so that two such kegs may be connected with the system and when one keg has been emptied, one of the valves 53 of the fitting 50, for example, may be closed, and the other valve 54, leading to the new keg, may be opened.

As the cake of "dry ice" 16 absorbs heat (from the alcohol and from heat leaking into the compartment 14 from the outside of the cabinet and also from the upper part 12 thereof) it evaporates by sublimation in a well-known manner and is converted into carbon dioxide gas ($CO_2$) sometimes called carbonic acid gas. Since this sublimation occurs at very low temperatures (around $-109°$ F.) this gas is of course itself very cold, and filling the compartment 14 as it does, it acts not only as an auxiliary refrigerant to extract heat from the heat transfer plate 35 and the alcohol flowing therethrough, but it may also be drawn off to transmit mechanical energy, as here shown, by the pipe 55 which has its lower end 56 terminating within and near the bottom of the compartment 14, to which the carbon dioxide tends to settle.

In accordance with our invention, the carbon dioxide gas thus drawn off is compressed by the compressor 57 of suitable commercial type driven by motor 58, and is stored under pressure in the pressure tank 59. By appropriate control mechanism usually built into the compressor as commercially furnished and not necessary to be here described, the pressure of the gas in the tank may be maintained say between 90 and 120 lbs. per square inch, the motor 58 being stopped when the higher limit is reached, and started again when the pressure drops to the lower limit. From the pressure tank 59 a pipe 60 leads the gas to a valve-fitting 61 (Fig. 1) from which a pipe shown in the diagrammatic view of Figure 1a as a continuation of the pipe 60 conducts the gas to the beer keg 52 to furnish the circulating pressure on the beer. By appropriate valve means such as a diaphragm valve mechanism 62 in the pipe 60 the pressure of the gas upon the beer in the keg 52 may be maintained at say 20 to 25 lbs. per square inch. The indicating gauge 63 visibly indicates this pressure, which may be controlled by regulation of the handle 64 on the valve mechanism 62.

As the beer is thus forced through the outlet pipe 51 and into the pipe 48 at relatively high pressure, it circulates through this pipe, first through the space 22 between the inner and outer shells 18, 19 of the container 17, then up through the space 21 between the vertical walls of the container, and empties through the port 49 into the main interior of the container or reservoir 24. Since, except for valving means next to be described, the reservoir 24 is hermetically sealed, the beer is still under pressure in the reservoir 24, the space in the reservoir 24 between the upper level of the liquid beer and the cover 25 being occupied by the carbon dioxide and other gases which pass into the reservoir 24 with the beer.

By reason of this pressure on the beer, when the draught cock 65 is opened by maniplation of the handle 66, beer is forced up through the draught pipe 67 which terminates at its lower end within and near the bottom of the reservoir 24, and, passing through the rim casting 20, communicates with the combined draught conduit and foam-control device 68 to which the draught cock 65 is connected, to control the flow and foaming of the beer.

We desirably provide also a by-pass draught tube 69 opening at its lower end 70 into the top portion of the reservoir 24, and, passing through the rim casting 20, connecting with the draught pipe 67 outside of the reservoir. A hand valve 71 in this draught tube 69 is suitably regulated usually at the factory so that passage through draught tube 69 is normally open to permit a relatively small quantity of beer or gas, as the case may be, to pass through this tube into the draught pipe 67 and there re-mingle with the beer drawn from the draught cock. We prefer normally to maintain the level of the beer in the reservoir 24 slightly above the inlet end 70 of the draught tube 69, as indicated, for example, by the broken line 72. We have found that if the level of the beer falls below the inlet end 70, gas will pass through the by-pass tube 69, and, mingling with the beer passing through the draught pipe 67 when the draught cock is opened, will sometimes create too much disturbance in the beer, causing excessive foaming. If this be the case, the operator will know that the level of the beer is below the inlet end 70 of the by-pass draught tube 69, due either to the keg 52 being empty or to an excess amount of gas accumulated between the level of the beer in the reservoir and the cover 25. Thereupon, he may open the escape valve 73 which permits excess gas in the top of the reservoir to pass off through the escape tube 74 having its inlet end 75 passing through the rim casting 20 and terminating within the reservoir 24 a short distance above the inlet end 70 of the by-pass draught tube 69. After the escape valve 73 has been open a short time, the operator will know, by quieting down of the disturbance in the beer drawn from the draught cock 65, that the level of the beer in the reservoir has been raised above the inlet end 70, whereupon he will close the escape valve 73; or, if the beer from the draught cock 65 continues to be too foamy, he will know that the level of the beer in the reservoir 24 has fallen consilerably below the inlet end 70 of the by-pass draught tube 69, indicating to him that the keg 52 is probably empty and that he should connect in another keg, as by means of opening one of the valve fittings 53 or 54, as the case may be, to connect this other source of supply with the reservoir and thereby raise the level of the beer in the reservoir again above the inlet end 70 of the by-pass draught tube. In the first case also, after opening the escape valve 73, he may find beer itself flowing therethrough, in which event he will know that the level is restored and will immediately close this escape valve. Thus the level of the beer is readily maintained somewhere between the inlet ends 70 and 75 of the by-pass draught tube 69 and the escape tube 74 respectively.

Figure 8:
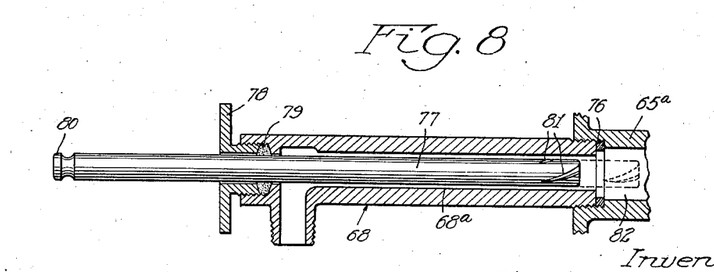
Figure 8 is a sectional view of the foam-control device, being a partial section taken on the line 8—8 of Figure 2.

Normally, with the use of our improved system and mechanism, the beer in the reservoir is permitted to settle and temper after its passage through the supply pipe 48, and, being well cooled and maintained cool, retains or takes up sufficient carbon dioxide gas to have a good body and attractive and pleasing sparkle, without undue disturbance when drawn from the draught cock 65. If more foaming is desired, however, we provide a foaming device combined with the draught conduit 68 and shown in detail in Figure 8.

As here shown, the draught conduit 68 is screwed into the shank 65a of the draught cock 65, a gasket 76 being interposed at the joint, and the bore of the draught conduit 68 being somewhat smaller in diameter than the bore of the shank 65a. The bore of the draught conduit 68 is partially filled by a long cylindrical plug 77 which is movable and held in selective positions concentrically with the bore of the conduit by a gland member or packing nut 78 screwed into the rear end of the conduit 68 and carrying a gland packing 79 which encircles the plug 77 and has tight frictional engagement therewith. The outer end of the plug 77 outside of the conduit terminates in the handle 80 by which the plug may be adjusted by loosening the nut 78 either inwardly or outwardly of the conduit 68. At its inner end, plug 77 has surface irregularities such as a helical groove or grooves 81 therein. As shown in full lines in Figure 8, with the plug 77 adjusted so that the helical grooves 81 are within the bore of the conduit 68, the beer passes under high pressure through the conduit, through the restricted annular space 68a between the walls of the bore thereof and the plug 77, and being forced into the grooves 81, will be given a swirling motion which enhances the foaming of the beer. If the foaming is desired to be minimized, the plug 77 may be pushed inwardly by the operator (first loosening the nut 78 and then tightening the nut 78) to the position shown in dotted lines in Figure 8, where the helical grooves 81 are beyond the restricted bore of the conduit 68. In this position of the plug, the beer upon passing into the larger bore 82 of the shank 65a of the draught cock 65 is relieved of some of the pressure upon it and the helical grooves 81 thereby are rendered ineffective to cause foaming. At the same time, the restricted annular passage 68a quiets the beer down when the beer passes into the larger bore 82 of the draught cock, so that the dispensing pressure at the draught cock 65 is reduced to nearly atmospheric pressure.

By means of the structure and system described, the cooling medium or carrier of heat, such as the alcohol referred to, may enter the space between the walls of the container 17 at the inlet 83 desirably at a temperature of about 36° F., it being desired to lower to and maintain the temperature of the beer at a dispensing temperature of about 44° F. at the draught cock. When drawn at about 44° F. the beer will generally have a serving temperature of about 50° F. or 52° F., which is recognized as about the proper chill for health and palatability. We have found that if the dispensing temperature of the beer is much more than 44° F., gas is liberated freely and the beer would tend to be too foamy and flat in taste. In other words, we have found that 44° F. is about the correct temperature to secure a maximum solubility of the gas in the beer. Since the entering alcohol need not be much cooler than say 33° F. or thereabouts, it will be understood that it is not necessary for all of the alcohol passing through the inlet 83 to have been passed into proximity with the "dry ice" by means of the heat transfer plate 35, and therefore the hand valve 45 can be adjusted at the factory to permit the greater part of the alcohol to circulate through the pump 33 and by-pass 44 without passing down into the compartment 14, the path through the by-pass 44 being the line of least resistance and the path which therefore the alcohol will normally take. By this adjustment of valve 45, however, all of the alcohol will not be able to pass through the by-pass 44 and a certain proportion of the alcohol will continue downwardly through the pipe 34 and will circulate through the heat transfer plate 35 and up through the pipe 42 to become very cold and remingle with the first-mentioned portion and pass therewith through the inlet 83 into the container 17. The portion of the alcohol which has been passed through the heat transfer plate having had its temperature so greatly reduced by being brought into proximity with the "dry ice" at approximately —109° F. readily lowers the temperature of the stream of alcohol entering the container. If a lower temperature than say 33° F. for the stream of alcohol entering through the inlet 83 is desired, the valve 45 may be manipulated to cause more of the alcohol to pass through the compartment 14 and less through the by-pass 44.

This illustrates one practical means of accomplishing the desired proportional circulations of the cooling fluid.

Under the pressure created by the pump 33, the alcohol entering the container 17 at the inlet 83 passes first into the space 22 between the horizontal walls of the shells 18, 19. Through the relatively thin metallic walls of the beer supply pipe 48 heat is taken up by the relatively cooler alcohol from the relatively warmer beer flowing through the pipe 48 and particularly from the beer when it first enters and is flowing through the coil 84 of the pipe 48 which is coiled below the bottom wall of the inner shell 18 and in the space 22. Under the pressure of the pump, the alcohol rises through the annular space 21 between and about the coils of the pipe 48, the alcohol thus flowing in the same direction as the beverage and along with it but separated therefrom by the thin metallic walls of the pipe 48, the alcohol, as already explained, passing out from the container 17 through the passage 23 at the top of the space 21, and back to the pump. By reason of the fact that the pipe 48 is of substantially the same diameter as the distance between the shells 18, 19 of the container, the alcohol is disposed to take a spiral course up through the space between the walls which enhances the period during which the flowing beer is in close proximity with the flowing cooling medium.

It will be understood that it is not necessary for the cooling medium to be flowing all the time, and we provide automatically-actuated heat-responsive mechanism for causing the cooling medium to circulate as and when necessary to produce the desired cooling effect. For this purpose we desirably insert into the path of the cooling medium a heat-responsive element, such as a closed metallic bulb 85 (Figures 1a, 4 and 5) filled with, say, sulphur dioxide or some similar expansible fluid and connected by a tube 85a with a bellows (not shown) and other conventional automatic switching mechanism, indicated generally by the numeral 86. By the leads 87, the automatic switching mechanism 86 is connected with the motor 46 in an appropriate manner not here necessary to be described, to start and stop the motor 46 and thus to start and stop the pump 33. The switching mechanism 86 may be provided with the usual "on-and-off" rotatable knob 88 by which the motor 46 may be placed entirely out of circuit if desired. Another rotatable knob 89 is provided by which the temperature variation within which the switching mechanism automatically operates, may be selectively controlled, in a well-known manner common to this type of mechanism.

Figure 4:
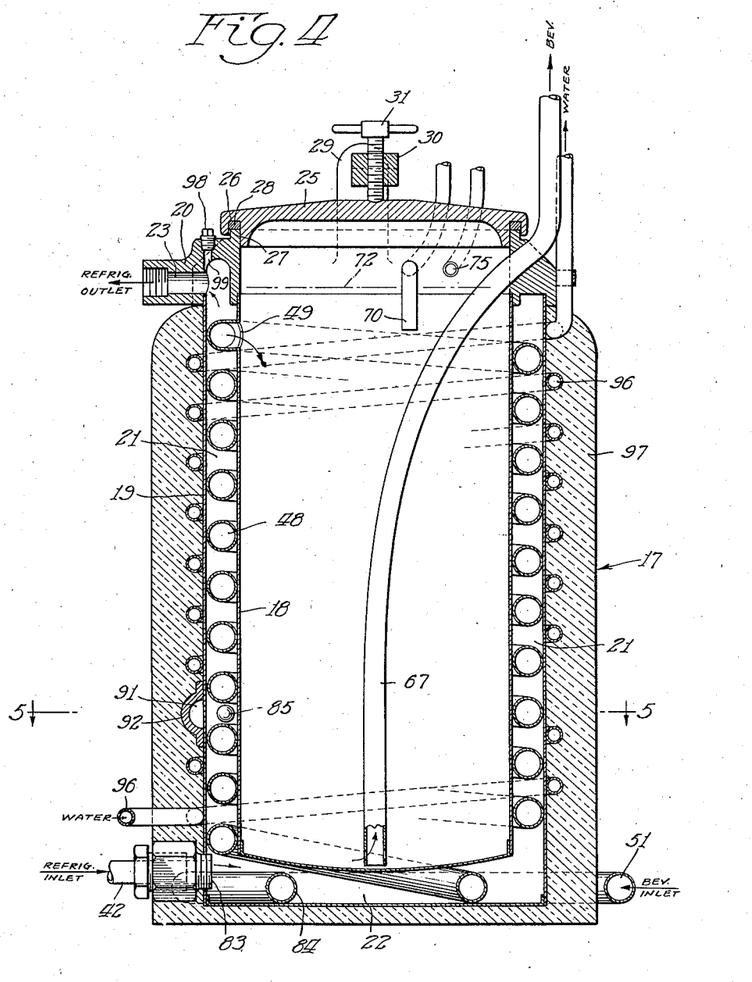
Figure 4 is a vertical sectional view of the storage and settling reservoir shown in Figure 1a, somewhat enlarged.
Figure 5:
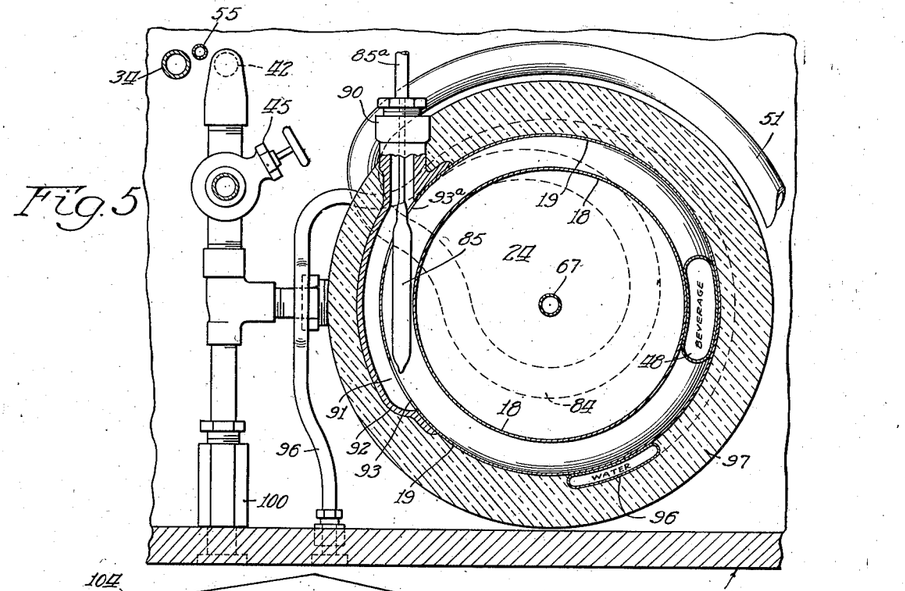
Figure 5 is a cross-section taken on the line 5—5 of Figure 4.

As best shown in Figures 4 and 5, the thermostat bulb 85 passes through a gland-fitting 90 and into the space 21 between any two of the coils of the pipe 48 and desirably somewhat below the middle point of the container 17. Since the bulb 85 tends to obstruct the pathway of the cooling medium at this point, a by-pass duct 91 communicating at each end with the space 21 in the vicinity of the bulb 85 at each end of the bulb, serves as a path for the alcohol, to compensate for the portion of the path obstructed by the bulb 85. As shown, the duct 91 may be provided by a lateral channeled member 92 which also carries the gland-fitting 90 and is suitably secured as by welding or the like to the wall of the outer shell 19 of the reservoir, apertures 93 and 93a being made in the wall 19 to communicate with each end of the duct 91.

The thermostatic device just described may be adjusted to stop the motor 46 at a lower limit of say 33° F. That is to say, when the alcohol passing up through the annular space 21 into the vicinity of the thermostat bulb 85, is at about 33° F., the motor will stop, this temperature of 33° F. resulting from the temperature of the combined mixture of that portion of the alcohol passing through the by-pass 44 and the portion circulated through the compartment 14. The beer is then at say 44° F., the desired temperature. When the greater part of the beer in the container is at about 44° F., slight variations in temperature of portions thereof will not alter the dispensing temperature appreciably. When, however, substantial draughts of beer are drawn through the draught cock 65 for serving, and a substantial new supply of warm beer is forced into the pipe 48, the temperature differential between the beer now in the container and the alcohol will be increased and the rate of heat-exchange between the two will also be increased, rapidly raising the temperature of the alcohol to say 43° F. Thereupon the thermostatic device will start the motor 46 and the alcohol will be circulated until the stream thereof passing the thermostat is again at the lower temperature of 33°F., which will soon occur when the temperature of the alcohol leaving the container is about the same as that entering it. Thereupon the thermostatic device will be actuated to shut off the motor 46, and stop the pump 33, which will not again operate until the alcohol again rises to a temperature of about 43° F., whereupon the cycle is repeated. By proper factory adjustment of the valve 45, the heat content of the alcohol at the inlet 83 may be predetermined for certain predetermined average conditions of service so that even with rather frequent intermittent withdrawals or draughts of beer, the operation of the pump 33 will still be intermittent, running, for instance, commonly one-half minute out of every two and one-half minutes. If the beer were drawn more rapidly than normally, the pump would run more often to compensate for the more rapid cooling effect necessary. Or, if the control member 89 of the thermostat mechanism were set for a lower temperature range, for example 28° F. to 38° F., the pump would tend to run more frequently, and if it ran too frequently the valve 45 could be adjusted to cause a greater proportion of the alcohol to circulate through the compartment 14.

Since the reservoir 24 is immersed in the alcohol and the latter is equally in proximity with the beer in the reservoir 24, it absorbs heat therefrom as well as from the beer flowing through the pipe 48 into the reservoir 24, and since the cool alcohol first entering the container comes in immediate contact with the lower horizontal wall of the reservoir 24, the beer in the reservoir 24 is ensured to be maintained at the temperature of about 44° F., or whatever the system is set for. Also, since the lower end of the draught pipe 67 is near the bottom of the reservoir, the beer drawn from the draught cock 65 is ensured to be cool at all times and properly settled and tempered and thus in the preferred state as to gas content, body, etc., to be attractive and palatable. Furthermore, since the beer makes a complete cycle through the coils of the pipe 48 and then down to the bottom of the reservoir 24, it passes twice into proximity with the coldest alcohol, further ensuring proper cooling under all conditions of service and even under widely varying conditions. Since, in this instance the specific heat of the carrier or alcohol is approximately .5 while that of the beer is approximately .9 the temperature of the alcohol in the space 22 is raised more rapidly than the temperature of the beer is lowered, and consequently the beer at the bottom of the reservoir does not get substantially any colder than 44° F. for the conditions described.

An ample supply of pre-cooled beverage is also assured by the reservoir 24 as well as means for causing the beer to re-absorb its original content of carbon dioxide. It has been found that with our improved system about 14 lbs. of "dry ice" will cool a barrel of beer (32 gals.) from 60° F. to 44° F. under normal draught conditions, which is decidedly economical operation. Stating the result in another way, our improved system is capable of satisfactorily disposing of about 3600 B. t. u. per hour under the conditions and with the arrangement described.

It is customary to have a faucet for drinking-water carried by the cabinet 10, and we have provided such a faucet 94 which draws water from the city main, for example, through a pipe (not shown) connected with the valve-fitting 95 and passing through the pipe 96 coiled around the outside of the outer shell 19 of the container, whereby the water drawn from the faucet 94 is also cooled by the heat transference through the walls of the pipe 96 and the walls of the shell 19 by the same cooling medium which cools the beer. It will be understood that the entire container 17 may be jacketed with suitable insulation 97, of cork or the like.

If it is desired to empty the reservoir 24 as for cleaning purposes, the valves 71 and 73 may be both closed and gas pressure accumulating in the reservoir will gradually cause it to empty.

Access to the storage and settling container and the mechanism associated therewith housed in the upper portion 12 of the cabinet 10 may be conveniently had by removing the cover 104 of the cabinet 10.

It will be understood that when two kegs of beverage supply are connected into the system at the same time as suggested, a branch of pressure pipe may be taken from the pipe 60 to the second keg.

Obviously, the invention is not limited to the details of construction and sequence of method steps described for purposes of illustration. Furthermore, it is not essential that all features of the invention be used conjointly, as various combinations and sub-combinations may be advantageously employed. Such changes may be made as fall within the scope of the following claims without departing from the invention.

Having thus described our invention, we claim:

1. In a system of the class described, the combination of a double-wall pressure-tight sealed container, a pipe coiled spirally between the walls and opening at the top into the interior formed by the inner wall; means for forcing a liquid to be cooled through said pipe and into said interior; means for circulating a cooling fluid through the space between the walls and in contact with the pipe; and a draught-cock for drawing off the cooled liquid under pressure.

2. The structure of claim 1 wherein a heat-responsive element is interposed in the path of the cooling fluid in the space between said walls and wherein mechanism controlled by said heat-responsive means is provided to circulate the cooling fluid.

3. The structure of claim 1 wherein the draught-cock is connected at one end with a draught-pipe terminating at its other end within and near the bottom of said interior and wherein a by-pass draught-tube is connected at one end to said draught-pipe and at its other end terminates within and near the top of said interior.

4. The structure of claim 1 wherein the draught-cock is connected at one end with a draught-pipe terminating at its other end within and near the bottom of said interior and wherein a by-pass draught-tube is connected at one end to said draught-pipe and at its other end terminates within and near the top of said interior, and wherein an escape tube having a valve at one end also terminates at its other end within and near the top of said interior and above the termination of the said by-pass tube.

5. The structure of claim 1 wherein the coiled pipe is of thin metal and of a diameter substantially equal to the width of the space between the walls of the container whereby the cooling fluid is disposed to take a spiral course through said space in proximity with said pipe.

6. In a system of the class described, the combination of a double-wall container; the interior with said inner wall providing a reservoir; a cover plate for said reservoir; clamping means effecting a pressure-tight seal between said cover plate and the reservoir; a pipe coiled spirally between the walls of the container of a diameter substantially the width of said space and opening at the top of the container into said reservoir; an inlet at the bottom of the container opening into the space between said walls; and an outlet at the top therefrom; means including a pump for circulating a cooling liquid through said space to enter at the bottom and flow upwardly through said space; said means including a pipe connecting said outlet with a pump and another pipe connecting said pump and said inlet; a metallic heat-exchange plate having ducts therein providing a devious path for the cooling liquid; a heat-insulated compartment receiving the plate; said plate being adapted to support a block of "dry ice" or the like thereon; a motor for driving the pump; a heat-responsive element immersed in the cooling liquid between the walls of the container; mechanism controlled by said heat-responsive element to stop and start the motor to control the circulation of the cooling fluid; a by-pass between the pump and the inlet member to circulate a portion of the cooling fluid apart from the heat-exchange plate; a supply of beverage connected to the lower end of the coiled pipe; means for leading off the gas of sublimation of the "dry ice" from said compartment; a compressor for storing said gas under pressure; valving mechanism for passing the gas under predetermined pressure to effect a pressure on the beverage to cause the beverage to circulate through the coiled pipe and into the reservoir under pressure of said gas; a draught-pipe entering the reservoir and terminating near the bottom thereof at one end and having a draught-cock connected thereon outside of the reservoir for drawing off the cooled beverage under pressure; and a by-pass tube connected at one end with the draught-pipe and opening into the upper end of the reservoir.

7. The structure of claim 6 wherein the heat-exchange plate comprises a base and a grooved corrugated member, the grooves therein being closed by said base and communicating with another at alternate ends of the plate to provide one or more devious paths through the plate.

8. The structure of claim 6 wherein a foaming device is interposed in the draught-pipe comprising a restricted bore and a bore of larger diameter communicating therewith and wherein a movable plug partially fills the restricted bore and has irregularities in the surface thereof at its inner end to be disposed upon adjustment of the plug selectively either within the restricted bore to cause foaming of the liquid or within the enlarged bore to be relatively ineffective.

9. In a system of the class described, the combination of a double shell heat-insulated container; a separate heat-insulated compartment; means for circulating a cooling fluid through the space between the shells; means for sealing the interior of the inner shell; a pipe coiled spirally in the space between the shells to be immersed in the fluid and opening at the top into said interior; means for forcing liquid through said pipe and into said interior under pressure; and temperature-responsive means for controlling the circulation of the cooling fluid proportionally to the temperature differential between the cooling fluid and the container.

10. In a cooling and dispensing system of the class described, the combination including means for circulating a liquid to be dispensed, said means embodying a reservoir for storing the liquid under pressure and a draft pipe communicating with said reservoir, wherein a foaming device is interposed in the draught-pipe comprising a restricted bore and a bore of larger diameter communicating therewith and wherein a movable plug partially fills the restricted bore and has irregularities in the surface thereof at its inner end to be disposed upon adjustment of the plug selectively either within the restricted bore to cause foaming of the liquid or within the enlarged bore to be relatively ineffective.

11. In a system of the class described, the combination of a heat-insulated container; means for passing a beverage through said container for draught purposes; a low-temperature heat-exchange area comprising a bifurcated conductor having a pair of sinuous closed channels connected therewith, the channels thereafter communicating; means for circulating a cooling liquid through said container in separated but heat-exchange relation with the beverage; and means for circulating a predetermined portion of said cooling liquid through the said low-temperature heat-exchange area and by-passing the remainder of said liquid directly back to the container.

12. The structure of claim 11, wherein the container embodies means for circulating the liquid to be cooled and the cooling liquid in separated proximity in the same direction over the major part of the area of the container.

13. The structure of claim 11, wherein the container embodies means for circulating the liquid to be cooled and the cooling liquid in separated proximity in the same direction over the major part of the area of the container, and wherein the container embodies further means for subsequently reversing the direction of flow of the liquid to be cooled to bring the liquid to be cooled a second time into separated heat-exchange proximity with the cooling liquid.

14. In a system of the class described, the method characterized by the steps of: providing a relatively high temperature heat-exchange area; circulating a fluid carrier of heat into proximity with said area; providing a low temperature heat-exchange area; circulating at least a portion of the liquid carrier into proximity with said low-temperature area; circulating a liquid to be cooled in said high-temperature area in close but separated proximity with the carrier; causing said liquid to be cooled to flow first in the direction of flow of the carrier, and then in the reverse direction to be brought again into proximity with the carrier; controlling the rate of flow of the carrier into proximity with both of said areas proportionally to the temperature differential between the carrier and liquid to be cooled.

CHARLES S. O'NEIL.
ELMER M. WACHTEL.